May 27, 1930.  J. E. MITCHELL  1,760,312
COTTON HARVESTING MACHINE
Filed Feb. 15, 1929    3 Sheets-Sheet 2

INVENTOR
JOHN E. MITCHELL
BY
ATTORNEY.

May 27, 1930.  J. E. MITCHELL  1,760,312
COTTON HARVESTING MACHINE
Filed Feb. 15, 1929  3 Sheets-Sheet 3

INVENTOR:
JOHN E. MITCHELL.
BY
ATTORNEY.

Patented May 27, 1930

1,760,312

UNITED STATES PATENT OFFICE

JOHN E. MITCHELL, OF ST. LOUIS, MISSOURI

COTTON-HARVESTING MACHINE

Application filed February 15, 1929. Serial No. 340,065.

This invention relates to cotton harvesting machines of the type in which the cotton is gathered, partially cleaned, and collected in a container as the machine is being drawn over the cotton plants.

In some of its aspects, the present invention may be regarded as an improvement in the combined cotton harvesting and cotton cleaning machine described and claimed in my pending application Ser. No. 188,648, filed May 4th, 1927.

The general object of the present invention is to provide a machine in which the cotton and cotton bolls will be removed from the plants by a saw cylinder co-operating directly with stationary stripping members between which the stalks of the plants are forced in the movement of the machine over the rows of cotton, and which saw cylinder, in turn, co-operates with other members in cleaning the cotton.

Other objects of the invention are, to provide an arrangement of parts in a cotton harvesting machine employing a saw cylinder as a combined cotton gathering and cleaning element cooperating with stationary stripping members, in which the saw cylinder shall be of such width as to extend beyond the stationary stripping members at each side of the latter, whereby to provide for the free action of the saw cylinder on the mixed cotton and hulls in the working chamber, and for the discharge of hulls from such chamber, without interference with the cotton and bolls which are drawn into the working chamber by the central portion of the saw cylinder; to provide in a machine of the above character a novel form of kicker roll which shall operate to force the hulls and trash removed from the cotton carried by the saw cylinder in a right and left hand direction in the working chamber of the machine, or, in other words, toward opposite ends of the saw cylinder, so that the hulls and trash may have a free and open discharge space from the bottom of the hullboard co-operating with the saw cylinder out of the path of the incoming mixture of cotton and hulls; to provide in a cotton harvesting machine a series of stripping members movable in one direction in relation to the cotton being stripped and a co-operating saw cylinder the lower portion of which rotates in the opposite direction, the saw cylinder and stripping members co-operating to force the cotton into a gradually narrowing space between the two, so that the cotton is either extracted from the bolls by the saw cylinder or the bolls themselves are snapped by the saw cylinder from the stalks and broken up by being forced by the saw cylinder against a fixed member of the machine; and, finally, in a machine of the character described, to provide a double hullboard to co-operate with the saw cylinder extending throughout the length of the saw cylinder, so that the gathered cotton and hulls first pass through the spaces defined by the saw cylinder and hullboards and then into the working chamber of the machine, while the hulls and trash separated from the cotton by the kicker roll are discharged from the working chamber through these same spaces.

In the accompanying drawings—

Figure 1:
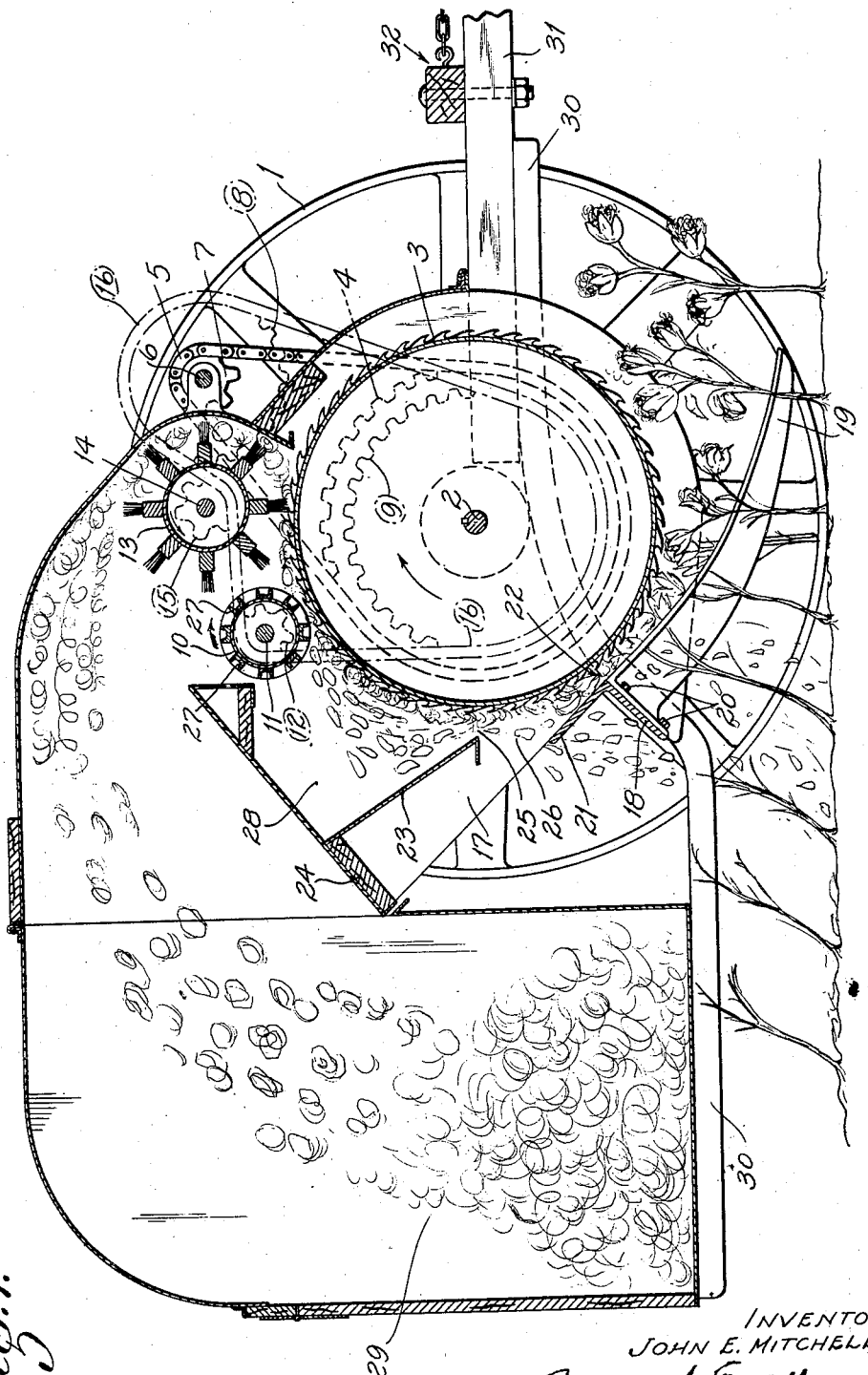
Figure 1 is a longitudinal sectional view through a combined cotton harvesting and cleaning machine constructed according to my invention.

Refering now to the drawings, the numerals 1 indicate traction wheels upon which the entire machine is mounted and supported. These wheels revolve axially around a shaft 2 on which is fixedly secured a saw cylinder 3. A sprocket wheel 4 attached to the hub of the right-hand traction wheel (Fig. 2) drives by means of a chain 5 a counter-shaft 6, the latter having a small sprocket wheel 7 for actuation by the chain 5. On the opposite end of the counter-shaft 6 there is mounted a sprocket wheel 8 and in line therewith there is mounted on the corresponding end of shaft 2 a sprocket wheel 9. The numeral 10 indicates a kicker roll having a shaft 11 on one end of which is mounted a sprocket wheel 12. The numeral 13 indicates a doffing roll having a shaft 14 on one end of which is mounted a sprocket wheel 15. The sprocket wheels 8, 9, 10 and 15 are in line with each other and a sprocket chain 16 (Fig. 1) passes over the sprocket wheels 8, 9 and 10 and under the sprocket wheel 15, whereby the saw cylinder, doffer roll, and kicker roll are driven from said sprocket chain 16 as the traction wheels 1 are moved over the ground.

Figure 2:
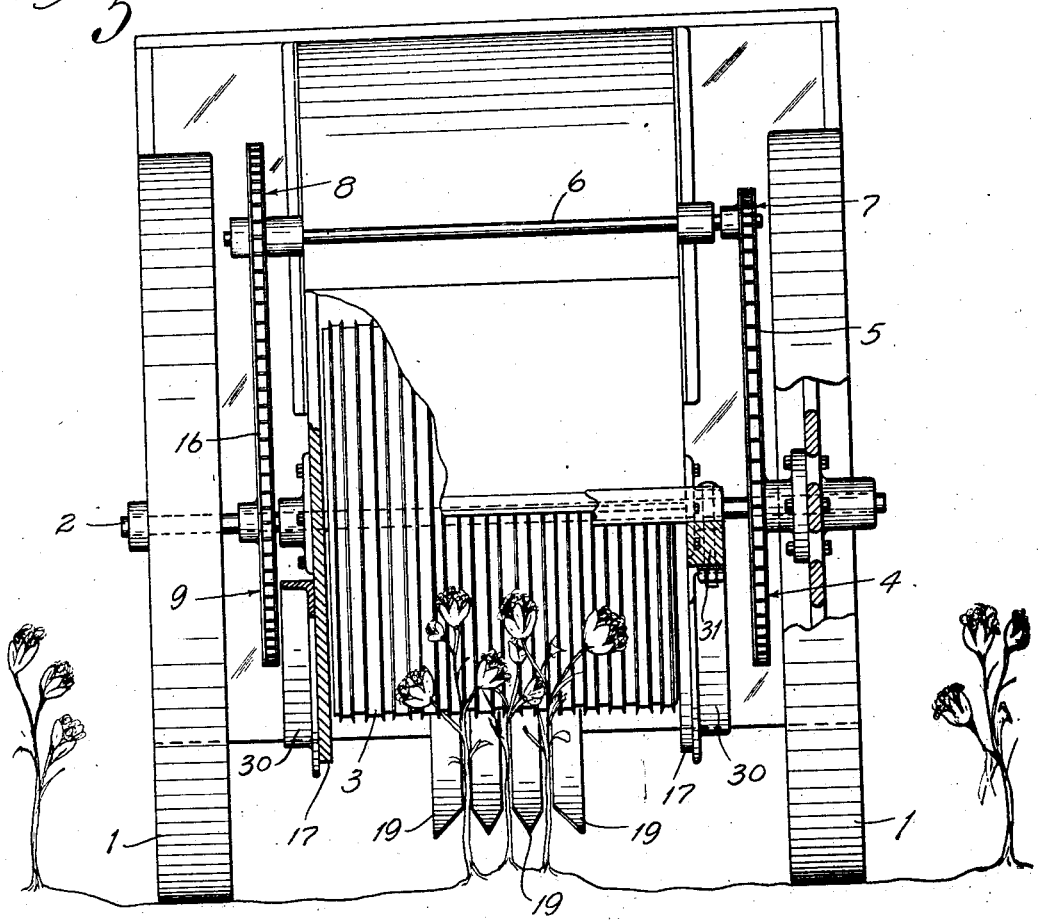
Figure 2 is a front elevation partly in section.

Secured to and extending between side frame members 17 (Fig. 1) is an angle bar 18, in the center portion of which, in the construction illustrated in Figs. 1 and 2, are secured a number of stripping members 19, the upper ends of these stripping members being preferably bolted to the lower side of the angle bar 18, as indicated at 20 in Fig. 1. The upper portion or side 21 (Fig. 1) of the angle bar 18 which, as stated, is co-extensive in width with the saw cylinder, constitutes the lower hullboard of the device. In the construction illustrated in Figs. 1 and 2, this hullboard defines the size of an opening 22 past the saw cylinder for the passage of cotton and broken bolls carried up by the saw cylinder in its central portion and for the escape of hulls out of the working chamber at either side of said central portion. The upper hullboard is indicated by the numeral 23 (Fig. 1). This hullboard extends between the side members 17, being secured at its upper end to a transverse frame member 24, and at its lower end defines the size of an opening 25 past the saw cylinder. The lower end of the hullboard 23 and the upper end of the hullboard 21 provide between them a relatively wide space 26, through which hulls and trash can be knocked out by the saw cylinder 3. A similar double hullboard arrangement is shown in various prior patents obtained by me; for example, No. 1,030,913, dated July 2nd, 1912. In this prior construction, however, the hullboards are mounted in a cotton cleaning machine in which the working chamber is fed with the mixed cotton and hulls from above.

Figure 3:
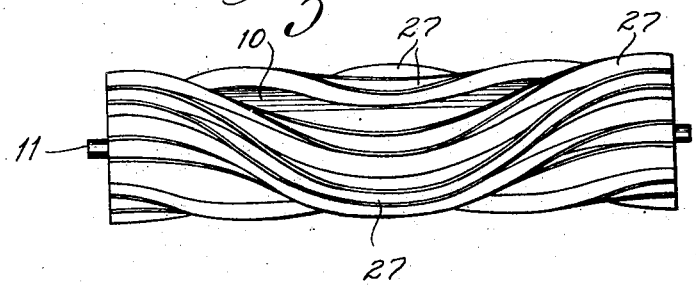
Figure 3 is a plan view of my improved kicker roll.

The kicker roll 10 which I use in the construction of machine illustrated in Figs. 1 and 2, is shown in Fig. 3. This kicker roll consists of a revolving drum on which the secured angle bars 27 which extend from the center to each end of the drum in an oppositely directed spiral formation, so that when the kicker roll 10 is rotated in the direction shown by the arrow in Fig. 1, it forces the hulls and trash removed from the cotton and carried up by the saw cylinder in a right and left hand direction in the working chamber 28, so that the hulls and trash have a free and open discharge space from the bottom of the hullboard 23 out of the path of the incoming mixture of cotton and hulls. In other words, and as will more clearly appear from an inspection of Fig. 2, it is only that central portion of the saw cylinder directly over the stripping members 19 which co-operates with the stripping members in stripping or extracting the cotton from the bolls, and that portion of the saw cylinder is consequently loaded with cotton while passing into the working chamber 28, and interferes somewhat with the return passage of hulls and trash through the gap 25 at the lower end of the hullboard 23. Hence, it is important to have the saw cylinder of a greater length than the total width of the stripping members, to provide a free outlet for hulls and trash at each end of the cylinder, and at the same time, avoid waste of cotton, and it is equally important to have the angle bars 27 of the kicker roll 10 mounted in a right and left spiral so that they will kick the hulls and trash to the right and left from the center of the saw cylinder, or toward the two ends of the same.

The cleaned cotton, after passing under the kicker roll 10, is removed from the saw cylinder by the brushes of the doffer roll 13, which throw the cleaned cotton back over into a container 29 provided at the rear of the machine and supported on the rear end of longitudinally extending bars 30 (Fig. 1) located at the sides of the machine. Conventional draft appliances, such as indicated by the numerals 31 and 32, are mounted on the frame of the machine, whereby it may be drawn by a team of mules or horses.

The foregoing description relates to a machine which is adapted to be drawn over each row of cotton in turn and lengthwise of the row. As the width of the plants in a row will be embraced within the width of the stripping members 19, it follows that only the central portion of the saw cylinder directly over the stripping members co-operates with them in stripping or extracting the cotton from the bolls, as explained above. It will be apparent, therefore, that this central portion of the saw cylinder will be loaded with cotton as it passes into the working chamber, and hence it is necessary, or at least desirable, to have the end portions of the saw cylinder free from engagement with incoming cotton, so as to provide spaces for the discharge of hulls from the working chamber and to permit of the free movement or agitation of the mixed cotton and hulls in the agitating chamber to permit of the separation of the cotton from the hulls by the saw cylinder.

Figure 4:
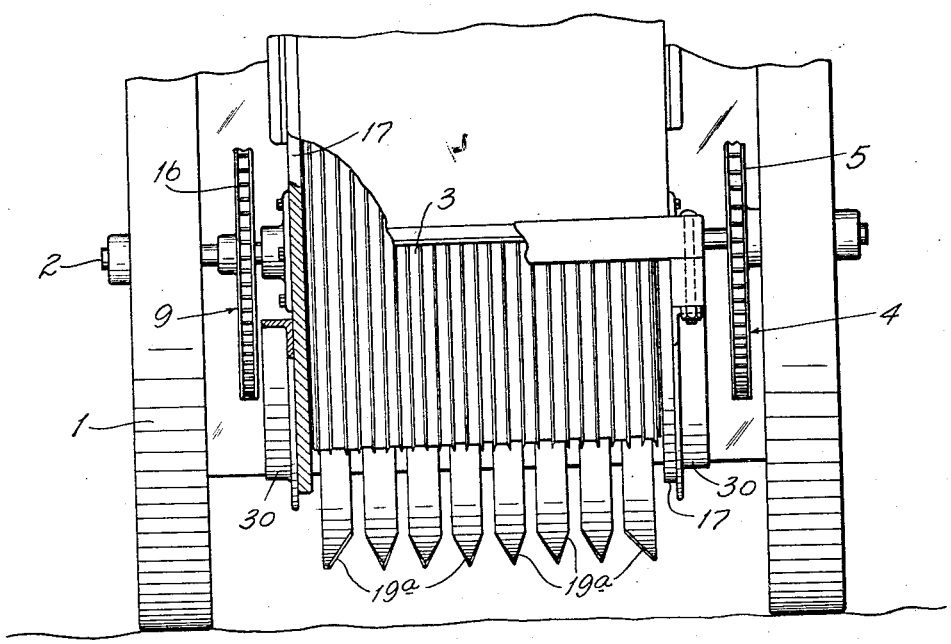
Figure 4 is a view similar to Fig. 2, but illustrating a modified construction in which the stripping members extend throughout the entire length of the saw cylinder.
Figure 5:
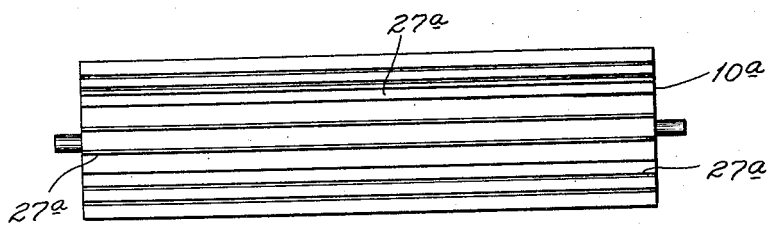
Figure 5 is a plan view of a kicker roll which would be used with the construction shown in Fig. 4.

In the modified construction shown in Figs. 4 and 5, the stripping members 19ª extend throughout the width of the saw cylinder 3, and the kicker roll 10ª is of the usual construction having straight longitudinally disposed angle bars 27ª provided around its periphery. Otherwise, the machine is of the same construction as that previously described.

This modified construction of machine is adapted for use where the machine would be moved crosswise of the rows of cotton and ordinarily be moved over the ground by a tractor mounted at the rear. That is to say, the harvester would be pushed and not pulled. In moving the harvester crosswise of the rows, the same congestion of cotton on the saw cylinder does not occur as when the machine is drawn lengthwise of the row, as individual plants which lie within the path of the stripping members and saw cylinder are operated on at one time and, in addition, there is an interval while the machine is passing over the space between two rows of cotton and no cotton is being gathered. By reason of this fact, the amount of cotton drawn into the machine as it passes crosswise over the rows is not sufficient to interfere with the discharge of the hulls and trash out of the working chamber through the space provided at the lower end of the upper hullboard 23.

In either type of machine, there is a distinct advantage arising from arranging the saw cylinder to co-operate with the stripping members 19 or 19ª in removing the cotton or the bolls from the cotton plant. By an inspection of Fig. 2, it will be seen that as the cotton plants pass into the spaces between the stripping members, they are immediately placed in a position to be acted on by the saw cylinder so that the cotton from the open bolls can be engaged and extracted by the teeth of the saws. By the time the stalks reach the rear end of the spaces between the stripping members, most of the free cotton will have been extracted from the open bolls, and as these bolls and the unopened bolls approach the narrow space at the lower edge of the angle bar 18, they will be broken off by contact therewith of the saw cylinder, leaving the ends of the stalks free to pass out of the spaces between the stripping members. In cotton harvesting machines as now used, stripping members such as 19 or 19ª mounted on the front of the machine are relied upon to strip the cotton and bolls from the plant as the machine is drawn over the ground. The result is that frequently the plants are pulled out of the ground or portions of the stalks are broken off with the cotton bolls, and the attendant has frequently to clear the spaces between the stripping members which become clogged up with the cotton, sticks and cotton plants. In providing an arrangement whereby the saw cylinder operates directly on the plants as they pass in between the stripping members, this disadvantage incident to the use of stripping members is largely obviated, for the reason, as stated, that the saw cylinder removes the cotton and bolls from the plants before the stalks reach the ends of the spaces between the stripping members, and hence they can readily pass out of such spaces.

In either form of the invention, as the saw cylinder rotates, hulls will be knocked out of the machine through the space 26 between the lower edge of the upper hullboard 23 and the upper edge of the lower hullboard 21, and thus a preliminary separation of hulls and cotton is effected before the mixed cotton and hulls passes into the working chamber 28. Also, in both forms of the invention, as the bolls separated from the stalks of the cotton plant pass through the narrow space between the saw cylinder and the lower edge of the hullboard 21, they will be crushed or broken and thus the separation of the cotton therefrom will be greatly facilitated in the working chamber, and the necessity for using a breaking cylinder, such as I have employed in former patented machines for breaking up the bolls, is avoided.

It remains to be stated that the saw cylinder 3 is of very greatly increased diameter as compared with the saw cylinders employed in the ordinary cotton cleaning machine placed on the gin, and, therefore, presents a large circumferential surface to engage the cotton plants; and as the diameter of this saw cylinder is as great, if not greater, than the length of the stripping members 19, so that its forward extension is substantially equal to that of the stripping members, it will be seen that the saw cylinder is in position to engage the bolls of cotton practically as soon as the stalks of the plant enter the spaces between the stripping members.

While the drawings illustrate the best embodiments of the invention known to me, it will be apparent that as to the broad features of the invention hereinafter outlined in the claims, the invention could have other embodiments than those shown, and I do not wish, therefore, to be limited to the precise construction or arrangement of parts illustrated.

I claim:

1. A combined cotton harvesting and cleaning machine, comprising a series of spaced stripping members adapted to be passed through the cotton plants, and a saw cylinder mounted for rotation above said stripping members to engage the bolls of cotton on the plants entering the spaces between said stripping members and defining a gradually narrowing space from the front ends of said stripping members to the rear ends thereof.

2. A combined cotton harvesting and cleaning machine, comprising a transverse stationary member, a series of spaced stripping members secured at their rear ends to said stationary member and adapted to be passed through the cotton plants, and a saw cylinder mounted for rotation above said stripping members to engage the bolls of cotton on the plants entering the spaces between said stripping members and having its outer surface located in sufficiently close proximity to said stationary member to break up any bolls entering between the saw cylinder and said stationary member.

3. A combined cotton harvesting and cleaning machine, comprising a series of spaced stripping members adapted to be passed through the cotton plants, a saw cylinder mounted for rotation above said stripping members to engage the bolls of cotton on the plants entering the spaces between said stripping members, and a pair of hullboards located to the rear of said stripping members and defining the size of openings past said saw cylinder and affording an opening between them for the discharge of hulls carried up by said saw cylinder.

4. A combined cotton harvesting and cleaning machine affording a working chamber and comprising a series of spaced stripping members adapted to be passed through the cotton plants, a saw cylinder defining one side of said working chamber and mounted for rotation above said stripping members to engage the bolls of cotton on the plants entering the spaces between said stripping members, said saw cylinder having a portion extending beyond the stripping members at either side, cleaning members co-operating with said saw cylinder, and a hullboard forming the lower side of said working chamber and the lower end of which defines the size of an opening past said saw cylinder for the escape of hulls from said working chamber.

5. A combined cotton harvesting and cleaning machine affording a working chamber and comprising a series of stripping members adapted to be passed through the cotton plants, a saw cylinder defining one side of said working chamber and mounted for rotation above said stripping members to engage the bolls of cotton on the plants entering the spaces between said stripping members, said saw cylinder having a portion extending beyond the stripping members at either side, a kicker roll co-operating with said saw cylinder and having oppositely disposed spiral bars adapted to knock the hulls and trash to opposite ends of the saw cylinder, and a hullboard forming the lower side of said working chamber and the lower end of which defines the size of an opening past said saw cylinder for the escape of hulls from the working chamber.

6. A combined cotton harvesting and cleaning machine, comprising a series of spaced stripping members adapted to be passed through the cotton plants, and a saw cylinder mounted for rotation above said stripping members to engage the bolls of cotton on the plants entering the spaces between said stripping members, said saw cylinder being of a diameter to have its forward side located substantially in the vertical plane of the outer ends of said stripping members and defining, with said stripping members, a gradually narrowing space extending from the front ends of said stripping members to the rear ends thereof.

7. A combined cotton harvesting and cleaning machine affording a working chamber, means including a saw cylinder for gathering cotton and bolls from the plants and feeding the same in an upward direction into said working chamber, a cleaning element operating in said working chamber and co-operating with said saw cylinder, and a pair of hullboards defining the size of openings between their lower ends and the surface of the saw cylinder for the escape of hulls and providing between them a space through which hulls and trash carried into the machine by the saw cylinder may be knocked out by the latter as it is rotated.

8. A combined cotton harvesting and cleaning machine, comprising an axle, a pair of traction wheels loosely mounted thereon and supporting said machine as it is drawn over the ground, a saw cylinder keyed on said axle, driving mechanism interposed between one of said wheels and said axle for rotating said saw cylinder at a relatively high rate of speed as the machine is drawn forward, and a series of stripping members mounted below said saw cylinder and operating to gather the stalks of the cotton plants into the spaces between them and to bring the cotton and bolls of the plants into position to be engaged by the saw cylinder as the machine is drawn over the rows of cotton.

In testimony whereof, I have hereunto set my hand.

JOHN E. MITCHELL.